H. D. PERKY, DEC'D.
L. SPARKS, ADMINISTRATOR.
MEANS FOR REDUCING CEREAL PRODUCTS TO FORM.
APPLICATION FILED MAR. 13, 1906.
1,143,311.
Patented June 15, 1915.
2 SHEETS—SHEET 1.
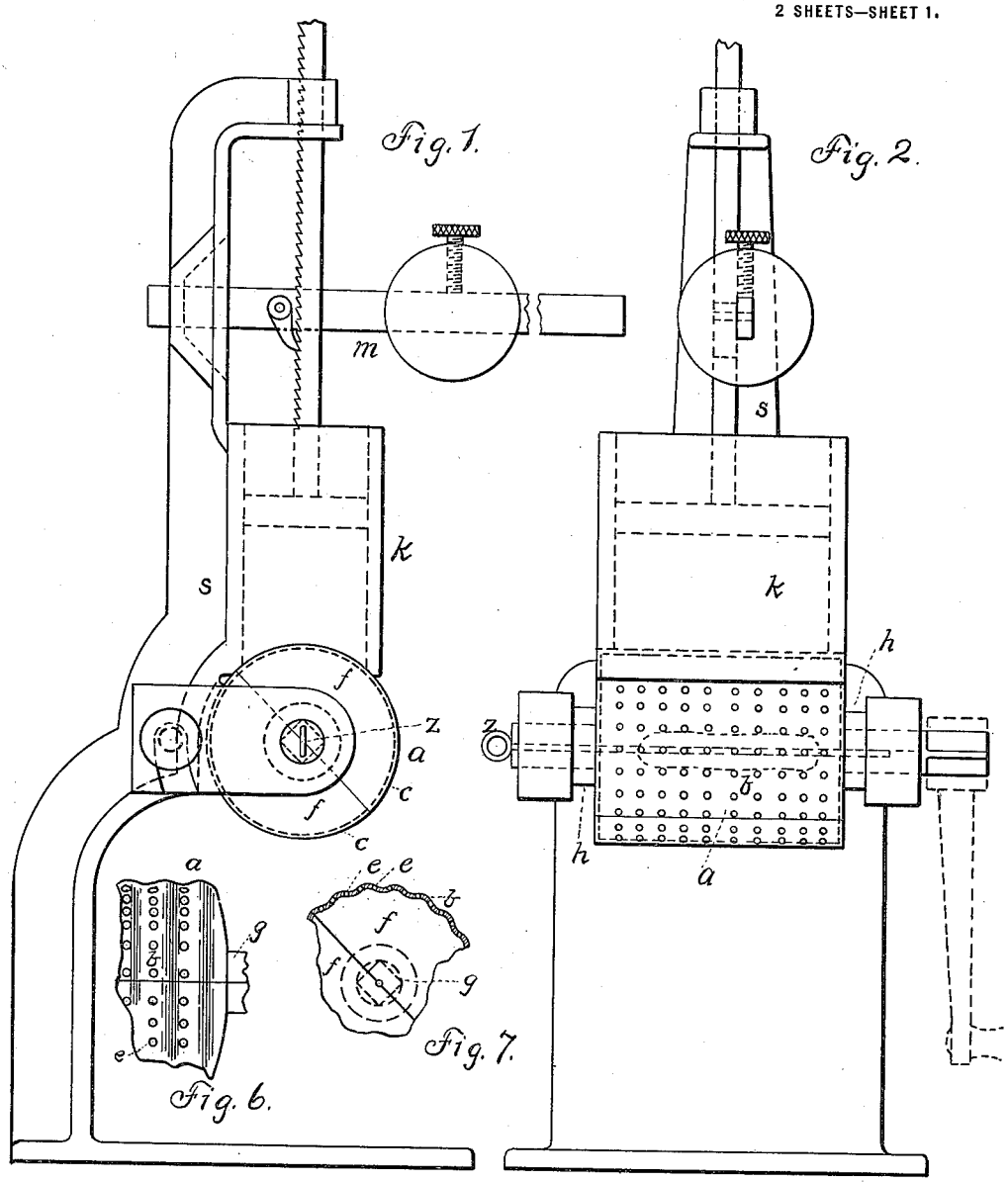
WITNESSES:
George M. Anderson.
Stuart Hilder.
INVENTOR.
Henry D. Perky
BY E. W. Anderson
his ATTORNEY.

H. D. PERKY, DEC'D.
L. SPARKS, ADMINISTRATOR.
MEANS FOR REDUCING CEREAL PRODUCTS TO FORM.
APPLICATION FILED MAR. 13, 1906.

1,143,311.

Patented June 15, 1915.
2 SHEETS—SHEET 2.

WITNESSES:
George M. Anderson.
Stuart Hilder.

INVENTOR.
Henry D. Perky
BY E. W. Anderson
his ATTORNEY.

UNITED STATES PATENT OFFICE.

HENRY D. PERKY, OF GLENCOE, MARYLAND; LIBAN SPARKS, ADMINISTRATOR OF SAID PERKY, DECEASED, ASSIGNOR, BY MESNE ASSIGNMENTS, TO THE SHREDDED WHEAT COMPANY, OF NIAGARA FALLS, NEW YORK.

MEANS FOR REDUCING CEREAL PRODUCTS TO FORM.

1,143,311.          Specification of Letters Patent.     Patented June 15, 1915.

Application filed March 13, 1906. Serial No. 305,898.

*To all whom it may concern:*

Be it known that I, HENRY D. PERKY, a citizen of the United States, and resident of Glencoe, in the county of Baltimore and State of Maryland, have made a certain new and useful Invention in Means for Reducing Cereal Products to Form; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 8:
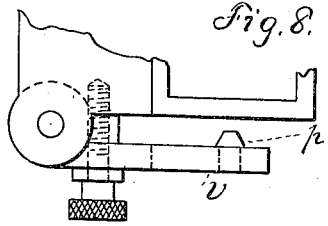
Figure 3:
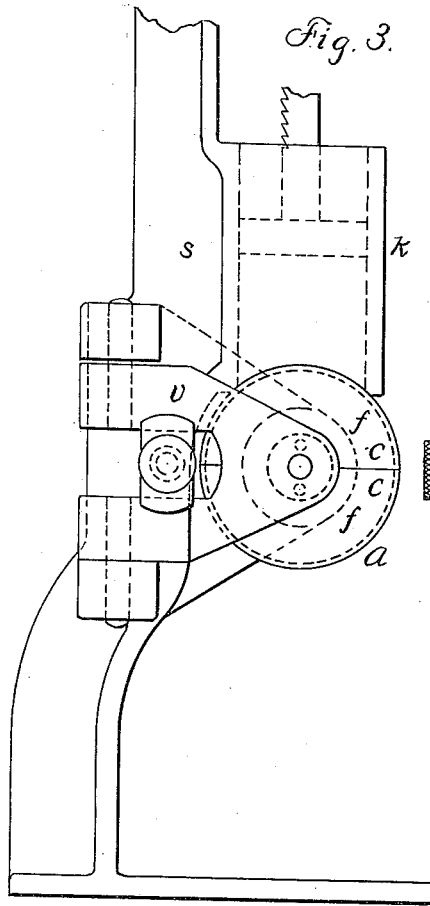
Figure 4:
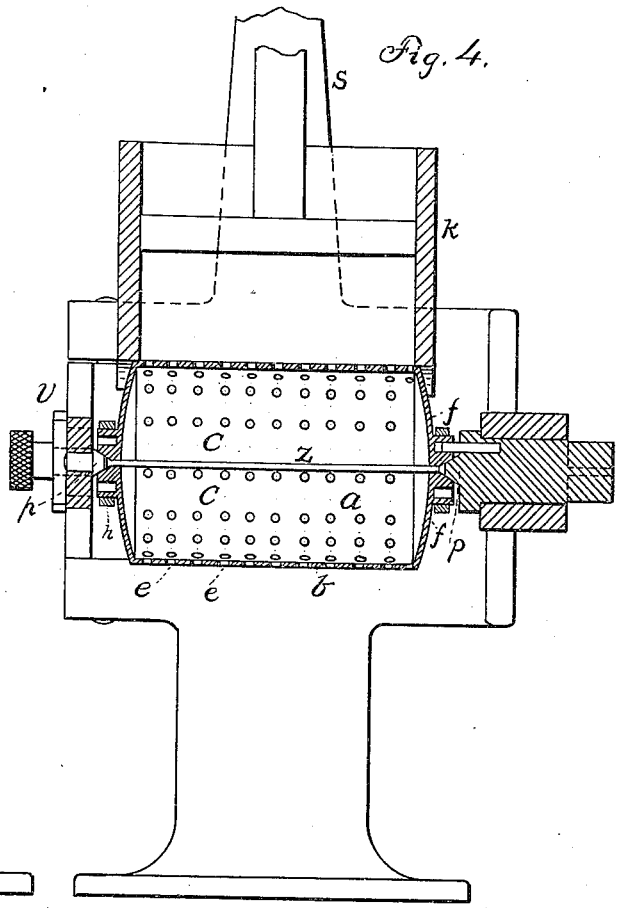

Figure 1 is a front view, illustrating the invention. Fig. 2 is a side view of the same. Fig. 3 is a side view showing a modification with hinged bearings. Fig. 4 is a longitudinal section showing a modified form of mold. Fig. 5 is a longitudinal section of mold with extended axial lugs. Figs. 6, 7 and 8 are details.

The invention is designed to provide means for making rolls or forms of cereal material; and it is further designed to provide means for making such rolls or forms around other material of edible character.

In the accompanying drawings, illustrating the invention, the letter $a$, designates a mold or forming receptacle having its wall or the main portion of its wall made of perforated tin, sheet metal or wire cloth, as at $b$. The mold is designed to be made in sections, as indicated at $c$, these sections being provided with means for holding them together, such means allowing them to be rapidly separated. When the sections are together in engagement, the mold is a closure into which entrance is designed to be made only through the perforations of its walls. These perforations are designed to be, of small or fine character, in order that the filaments to be formed thereby in filling the mold shall be tendril like or delicate. The edges of the perforations are stamped or bent slightly outward for quick reduction.

The material of which it is designed to make the roll or form is cereal, and it consists, preferably, of ground grain, for instance corn, mixed with about its bulk of water and cooked in a closed vessel until the water is absorbed; and when the cooked material is set or solidifies, it is in suitable condition for use.

In explaining the invention, I have shown a cylindrical mold, although other forms may be used, the sections of which are separable in the axial plane. The cylindrical portion of the wall is provided with a number of cutting perforations $e$, which are preferably of small diameter, and are quite close together. Perforated sheet metal may be used in making the wall. The sections are provided with semi-circular ends $f$, which, when the sections are put together, form the ends of the cylinder. The semi-circular ends are provided with central sectional or coacting lugs $g$, which are designed to fit each other neatly, and are of rectangular or prismatic form. When the mold sections are put together with their end lugs in engagement, they are designed to be secured together by means of a locking piece $h$, at each end of the mold. The mold being closed, it is ready to be filled, and this is accomplished by pressing it against the solidified cereal material, with or without motion along its surface, such action causing the material to be reduced by the perforated wall to elongated filaments or tendrils of crenated and curled character, which accumulate within the mold in an intermingled and engaged manner of more or less close character, but permeated throughout with interstices which communicate with each other. As the cylinder wall is of thin sheet metal and its integral cutting perforations are small and are distributed throughout its extent, when the cylinder is rotated a large number of threads or filaments are formed within it, so that it becomes charged quickly and evenly. Each mold section has a bearing lug at each end for engagement with the journal devices, so that the section is an entirety between said devices, and the thin-wall mold is in this manner braced against the pressure of the material fed to it. In order to facilitate filling such molds, a simple machine may be provided consisting of a holder $k$, for the material, which may be pressed toward the cylinder by means of a treadle device $m$. The cylinder being held in socket journals $p$, mounted in bearings of the frame $s$, can be rotated against the material in an effective manner. For this purpose, one of the socket journals should be provided with a crank handle, and the other journal should have an open or movable bearing $v$, so that the cylinder can, when filled, be readily removed from the machine. The cylinder with its content is then placed in a hot air chamber, and when the moisture has been evaporated from the inclosed filaments, the mold can be opened and the roll discharged ready for use.

When it is desired to make the roll around another edible so as to inclose the same, such edible, which may be chopped meat, sausage, fruit or other suitable substance is placed within the mold before closing the same. Or, the edible may be placed on an axial skewer pin $z$, having end bearings in the lugs, $g$, such skewer pin being readily withdrawn from the mold, or from the roll.

What I claim as my invention and desire to secure by Letters Patent is—

1. Means for making a filamentous roll, comprising separable sheet metal cylindriform sections having each a plurality of perforations, and sectional journals, means for connecting said sections together to form a closed cylindrical receptacle, a movable bearing for the journal, and means for rotating the receptacle.

2. Means for making a filamentous roll, comprising separable sheet metal cylindriform sections having each a plurality of perforations, means for connecting said sections together to form a closed cylindrical receptacle, axial journals at the ends of the receptacle, and an endwise-removable axial skewer pin within said receptacle and engaging said journals.

In testimony whereof I affix my signature, in presence of two witnesses.

HENRY D. PERKY.

Witnesses:
L. S. BURBANK,
WM. C. BREED.